United States Patent [19]

Dufner

[11] Patent Number: 4,516,789
[45] Date of Patent: May 14, 1985

[54] CROP CLEARING MECHANISM

[76] Inventor: Donald E. Dufner, Rte. 1, Box 124, Buxton, N. Dak. 58218

[21] Appl. No.: 423,668

[22] Filed: Sep. 27, 1982

[51] Int. Cl.³ .............................................. B60R 19/00
[52] U.S. Cl. ...................................... 280/160; 172/517
[58] Field of Search ........................ 280/160; 172/517; 56/119, DIG. 24, 395, 16.7

[56] References Cited

U.S. PATENT DOCUMENTS

| | | | |
|---|---|---|---|
| 888,348 | 5/1908 | Nichols | 172/510 |
| 1,046,104 | 12/1912 | Palmer | 280/160 |
| 2,210,219 | 8/1940 | Sievers | 56/119 |
| 2,645,503 | 7/1953 | Johnson | 280/160 |
| 2,723,521 | 11/1955 | Karlsson | 56/119 |
| 2,738,638 | 3/1956 | Pool | 56/119 |
| 3,214,894 | 11/1965 | Whitman | 56/119 |
| 3,526,055 | 9/1970 | Cortopassi | 47/1 R |
| 3,739,858 | 6/1973 | Spell | 172/59 |
| 4,062,305 | 12/1977 | Stoker | 111/1 |
| 4,321,786 | 3/1982 | Burton | 56/119 |

Primary Examiner—Joseph F. Peters, Jr.
Assistant Examiner—Joseph G. McCarthy

[57] ABSTRACT

A mechanism for clearing paths through a crop bed for the wheels of a tractor includes a pair of power driven vertically, parallelly disposed rotatable cylinders positioned forwardly of a wheel to be moved through a crop bed. The cylinders are rotated in opposite directions so as to engage and thereby displace a crop to either side of a path of a wheel. The speed of rotation of the cylinders is typically in excess of the speed of the tractor. A mounting for the cylinders is cantilevered forwardly of a wheel and includes a mounting for the cylinders which allows independent, limited rotation about an axis transverse to the motion of the tractor so as to permit the lower ends of the cylinders to pass over obstacles that may be present in the crop bed.

4 Claims, 4 Drawing Figures

CROP CLEARING MECHANISM

BACKGROUND OF THE INVENTION

1. Field of the Invention

This invention relates to crop clearing mechanisms and apparatus and is more particularly directed to a mechanism for displacing actively growing vegetation from the path of the wheel of a tractor that is moving through a crop bed. The purpose of my invention is to increase the yield of a crop through the use of an effective and facile mechanism to displace a growing crop away from the wheels of a tractor that may be driven through a field so as to preserve the growing crop by preventing destruction of the crop by the passage of the wheels of a tractor through the beds of the field.

2. Prior Art

The following prior art was noted in the course of a preliminary search based upon the disclosure of this application:

| U.S. Pat. No. | Inventor | Issued |
| --- | --- | --- |
| 888,348 | Nichols | 5/19/08 |
| 2,210,219 | Sievers | 8/6/40 |
| 2,645,503 | Johnson | 7/14/53 |
| 3,214,894 | Whitman | 11/2/65 |
| 3,526,055 | Cortopassi | 9/1/70 |
| 3,739,858 | Spell | 6/19/73 |
| 4,062,305 | Stoker | 12/13/77 |

Of the above patents, the Johnson U.S. Pat. No. 2,645,503 for TRACTOR WHEEL GUARD is directed to an early, elementary device for displacing growing vegetation from the path of a tractor wheel as the tractor is moved through a field. As may be appreciated from a consideration of the disclosure of the Johnson patent, the mechanism is primarily directed to an operation which permits deflection of the wheel guard by the vegetation, which renders the apparatus substantially ineffective.

Another of the prior art patents presently known to me is the Cortopassi Pat. No. 3,526,055, issued Sept. 1, 1970 for ROW CROP VINE LIFTER. The Cortopassi patent is directed toward displacing vegetation from a furrow, as distinguished from a bed in a crop field, and requires earth contacting rotary cylinders in combination with baffle plates and deflector wings, which may present only a partial solution to the crop conservation conundrum created by the cultivation requirements of a growing crop.

BRIEF SUMMARY OF THE INVENTION

My invention includes a pair of generally vertically disposed rotatable cylinders having one end disposed at the elevation of the wheel of a tractor, each connected to a variable speed motor on opposite sides of the vertical plane of the wheel of a tractor and adapted to be variably driven in a direction to displace vegetation from intermediate and in front of the cylinders toward the outboard side away from the vertical plane and path of the wheel at a surface velocity that is typically greater than the velocity of the tractor.

Another object of my invention is to provide a versatile mounting for disposing the rotatable cylinders in operative position which includes a forwardly extending horizontally disposed draw bar that is adapted to rotatably receive the top ends of the motors connected to drive the cylinders and to provide a limited amount of rotational freedom about an axis transverse to the line of travel of the tractor so as to allow the cylinders to deflect rearwardly and upwardly about the draw bar while permitting the gravitation effect of the cylinders to maintain a substantially vertical position and to allow the rotational engagement of the surfaces of the cylinder with the crop vegetation to tend to draw the cylinders forwardly and downwardly into operative engagement.

A further feature of my invention is provided by disposing the draw bar on the front ends of flexible cantilever members attached to the tractor, to be disposed forwardly of a wheel to be driven through crop vegetation so as to provide for and permit a limited, downwardly biased force on the draw bar and thereby maintain it in the desired operating position.

These and other objects of my invention will become apparent from a consideration of the appended specification, drawing and claims.

DESCRIPTION OF THE ILLUSTRATED EMBODIMENT

Figure 1:
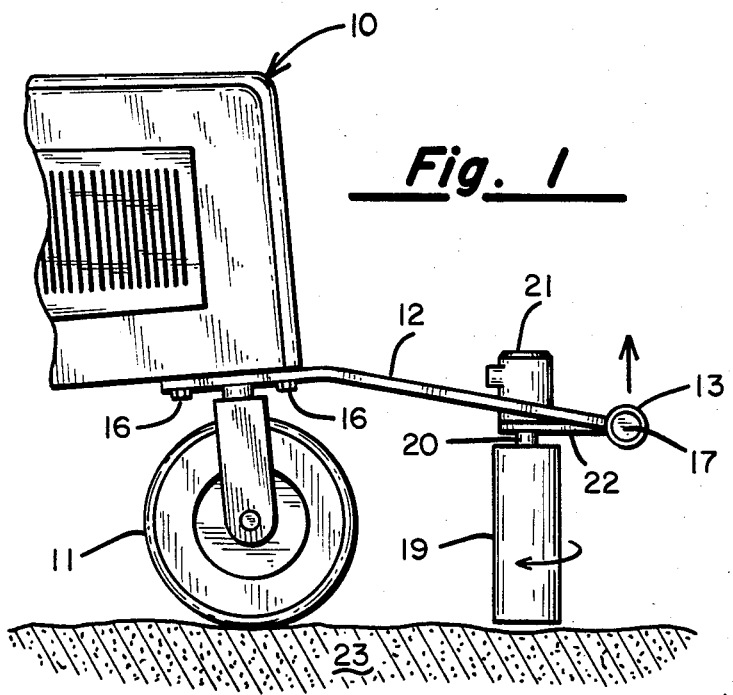
FIG. 1 is a fragmentary side elevation view of a tractor showing my invention disposed in front of a steerable wheel.

Referring to the figures of the drawing, a tractor, indicated generally by reference character 10, is shown having a steerable front wheel 11 disposed on the surface of a bed 23 as is typically formed intermediate furrows in a field for growing crops to be cultivated. The path of a wheel typically is a straight line as indicated by reference character 24 on FIG. 2 of the drawings. Center line 24 is also present in the vertical plane of wheel 11.

Right and left mounting members 12 and 14 are shown attached at their rear ends to the frame of tractor 10 by suitable bolts 16. The forward ends of mounting members 12 and 14 are disposed in side by side cantilevered relationship and include journals 13 and 15, respectively, for receiving a draw bar 17 that is generally horizontally disposed to extend laterally of the vertical plane of wheel 11. As is indicated on FIG. 1 of the drawing, the forward ends of mounting members 12 and 14 may move upwardly under vertical forces that may be encountered. Right and left rotatable cylinders 19 and 25 are shown depending downwardly from shafts 20 and 26 extending downwardly from hydraulic motors 21 and 27. Hydraulic motors 21 and 27 are in turn mounted on the ends of motor mounts 22 and 28, each having a forwardly extending portion to be rotatably disposed on draw bar shaft 17. Motor mounts 22 and 28 may be suitably laterally spaced apart through the incorporation of a spacer tube 30 on the center portion of draw bar shaft 17.

Figure 4:
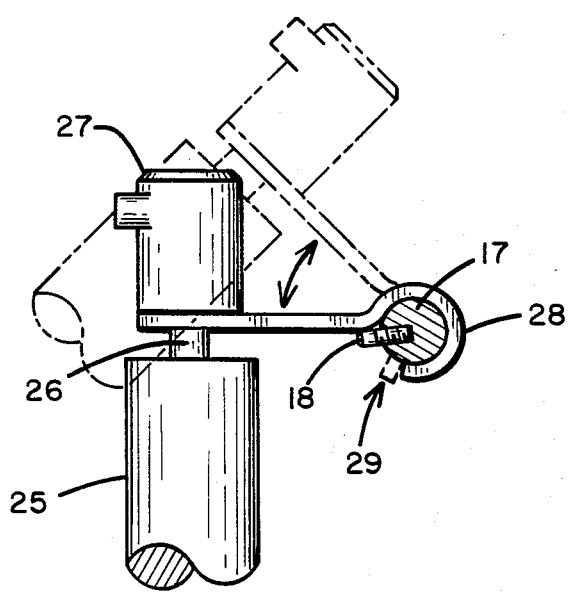
FIG. 4 is a fragmentary, enlarged sectional view taken along section line 4—4 on FIG. 3.

As may be seen on FIG. 4, motor mount 28 does not extend completely around draw bar shaft 17 and is provided with an open space of approximately 60 degrees. A stop member 18 is shown threaded into and extending radially outwardly of draw bar shaft 17 to coact with the extremities of gap 29 in the forward end of motor mount 28 so as to support motor 27 and cylinder 25 in a vertical position at one extreme and to allow rotation about draw bar 17 to the other extreme of operation permitted by engagement with stop member 18. Motor mounts 28 and 22 are of identical configuration and permit independent rotation thereof with respect to draw bar 17.

While motors 21 and 27 are illustrated as hydraulic motors, it is anticipated that any form of variable speed motor may be utilized to drive cylinders 19 and 25. It is further believed that the provision of a variable speed drive for any such motor, including hydraulic motors, is within the knowledge and ability of those skilled in the art and therefore the illustration of a complete drive system has been omitted with a view toward presenting an uncomplicated illustration of the invention.

It may also be noted that cylinders 19 and 25 are disposed in generally vertical side by side relationship on either side of the vertical plane of wheel 11 extending through center line 24 and that the adjacent portions of the cylinders are separated by a distance that is considerably less than the lateral thickness of wheel 11.

OPERATION OF THE ILLUSTRATED EMBODIMENT

Figure 2:
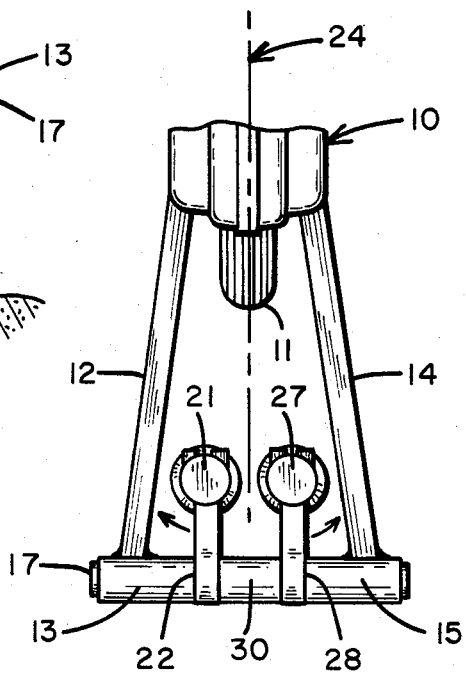
FIG. 2 is a fragmentary top plan view of the apparatus shown in FIG. 1.
Figure 3:
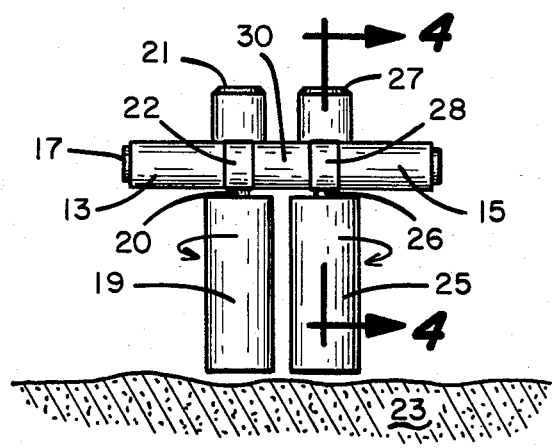
FIG. 3 is a fragmentary front elevational view of the apparatus of FIGS. 1 and 2.

When the tractor reaches a bed in the process of cultivating a field, and at the time wheel 11 starts traveling over a bed containing crop vegetation, motors 21 and 27 are energized to rotate in the directions indicated by the arrows on FIGS. 2 and 3 of the drawings, at a speed that may be determined visually by the operator and that is typically in excess of the speed of the tractor as it proceeds over the field. Vegetation that is encountered by the rotating cylinders is displaced laterally to the sides of wheel 11 with the result that a maximum amount of vegetation is moved out of the path of travel of wheel 11. Since the forces encountered by rotating cylinders 19 and 25 are in a lateral direction, they will remain in a substantially vertical attitude while providing the crop displacing function.

Should one or the other, or both, of cylinders 19 and 25 encounter a substantially immovable obstacle on bed 23, rotation about draw bar shaft 17 may occur up to the limit imposed by stop 18. However, during such displacement out of the normal operative position, the biasing forces tending to maintain cylinders 19 and 25 in the vertical operating position, consisting of the weight of the cylinders and motors on the trailing end of mounting members 22 and 28 and/or the rotation of cylinders 19 and 25 in engagement with the crop vegetation, become operative to direct cylinders 19 and 25 back toward the vertical position illustrated in FIG. 1. In the event an obstacle is encountered that may not be accommodated by the above described rotational motion, the front ends of mounting members 12 and 14 may move upwardly to allow the lower ends of cylinders 19 and 25 to pass safely thereover.

While my invention has successfully operated in connection with the cultivation of a crop of edible beans utilizing cylinders having smooth surfaces, it is anticipated that other forms of surface configurations and materials may occur to those skilled in the art upon applying the principles of my invention to other crops.

I claim:

1. Apparatus for clearing or displacing a crop to either side of the wheel of a tractor comprising, in combination:
    a pair of support bars secured to said tractor, one on either side of said wheel, in cantilevered attachment with forwardly projecting ends having limited vertical deflection;
    a draw bar mounted to and extending between said forwardly projecting ends;
    a pair of rearwardly projecting motor mounts pivotally attached to said draw bar, including a stop member for limiting pivotal motion of said motor mounts to a predetermined angular range; and
    a rotatable cylinder and means for rotatably driving said cylinder attached to each of said rearwardly projecting motor mounts, with said cylinder projecting downwardly and forward of said tractor wheel;
    whereby said cylinders may be rotatably driven in opposite directions and said cylinders may each be deflected upwardly upon contacting obstacles while clearing or displacing a crop.

2. The apparatus of claim 1 wherein said stop member further comprises means for limiting pivotal motion of said motor mounts to constrain said cylinder position between the vertical and an angle of no greater than 60° off the vertical.

3. The apparatus of claim 1, wherein said draw bar further comprises a bar having a circular cross section.

4. The apparatus of claim 3 wherein said motor mounts further comprise a semicircular end journaled about said draw bar.

* * * * *